W. PASS.
SADDLER'S IMPLEMENT.
APPLICATION FILED JAN. 2, 1918. RENEWED MAR. 8, 1919.
1,313,556. Patented Aug. 19, 1919.
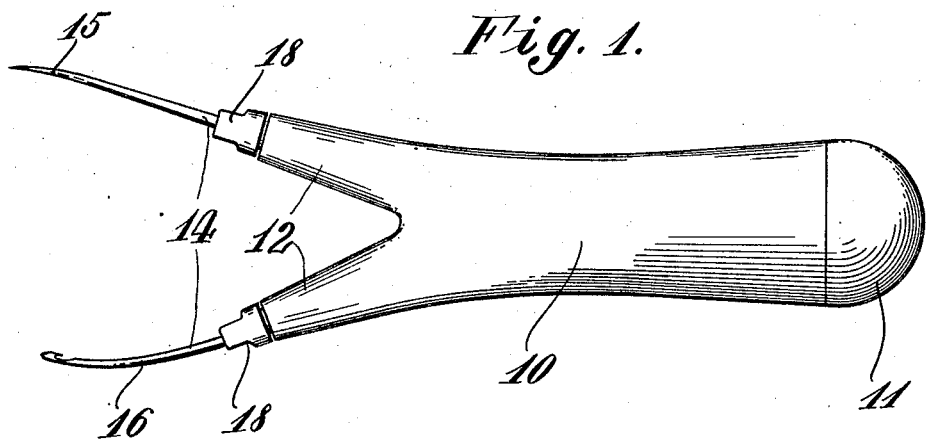
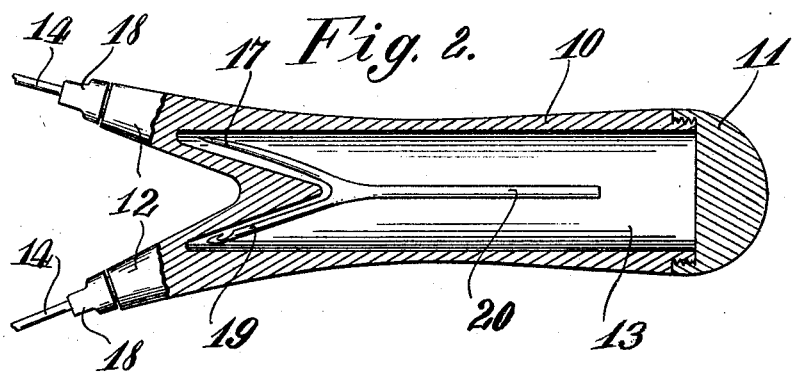
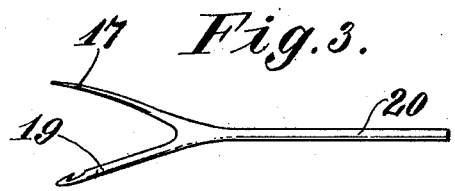
Inventor
Wendelin Pass
By his Attorney

UNITED STATES PATENT OFFICE.

WENDELIN PASS, OF EXPORT, PENNSYLVANIA.

SADDLER'S IMPLEMENT.

1,313,556. Specification of Letters Patent. Patented Aug. 19, 1919.

Application filed January 2, 1918, Serial No. 210,017. Renewed March 8, 1919. Serial No. 281,544.

*To all whom it may concern:*

Be it known that I, WENDELIN PASS, a citizen of the United States, resident of Export, county of Westmoreland, and State of Pennsylvania, have invented certain new and useful Improvements in Saddlers' Implements, of which the following is a specification.

This invention relates to improvements in saddlers' implements, and has as its special object the provision of a single tool having parts combined whereby a number of different operations may be conveniently performed.

A further object is to provide a tool which may be used as an awl or perforating tool and a hooked needle for drawing the threads, etc., such articles being contained within a hollow handle by which the implement is operated.

These and other like objects are attained by the novel construction and combination of parts hereafter described and shown in the accompanying drawing, forming a material part of this disclosure, and in which:—

Figure 1 is a side elevational view of an implement made in accordance with the invention.

Fig. 2 is a partial side elevational and transverse sectional view, the section being taken on the center line of the same, and Fig. 3 is a side view of the forked or pronged element used in connection with the handle.

In carrying out the invention, a hollow handle 10 is provided with a screw-threaded cover 11, opposite to which are the forked extremities 12, in which are engaged the shanks 14 of the awl 15 or needle 16.

In Figures 1 and 2 these tools are shown as held independently by the chucks 18, whereby a plurality of different sizes or lengths of the awls or needles may be used as desired, and it will be obvious that the chucks 18 are so arranged as to grasp the shanks 14 rigidly when in use, and it will also be evident that the receptacle 13 formed within the handle 10 may be used as a container for holding the several articles conveniently when not in use.

In Fig. 3 a combined awl 17 and needle 19 is formed with a stem 20 which may be held by the chucks 18 when in use or within the hollow handle 10 at other times, thereby permitting two awls or two needles of various sizes to be operated in the same handle at one time.

Having thus described my invention, what I claim as new and desire to secure by Letters Patent, is:—

1. A device as described, consisting of a hollow handle open at one end, the open end of said handle being threaded, a threaded cap engaging the threaded end of said handle, the opposite end of said handle being bifurcated so as to provide forked extremities diverging outwardly from said hollow handle chucks carried by the forked extremities of said handle adapted to receive needles, the inner ends of said forked extremities terminating in a central wedge-shaped portion projecting toward the center of said hollow handle.

2. In combination, a hollow handle closed at one end and open at its other end, a removable cap engaging the open end of said handle, the closed end of said handle formed with a wedge-shaped portion projecting centrally and inwardly from the closed end, said handle being also formed with integral diverging portions extending longitudinally thereof, and an implement adapted to be incased in said handle and also having diverging portions, one portion of which is shaped to the configuration of an awl, while the other portion is shaped to the configuration of a needle, said diverging portions of said implement adapted to straddle said wedge-shaped portion, and being of a lesser length relatively thereto so that the outer ends of both said awl and said needle may be spaced out of contact with the closed wall of said hollow handle.

In testimony whereof I have affixed my signature.

WENDELIN PASS.

Copies of this patent may be obtained for five cents each, by addressing the "Commissioner of Patents, Washington, D. C."